(12) United States Patent
Van Der Woude (10) Patent No.: US 8,276,392 B2
(45) Date of Patent: Oct. 2, 2012

(54) TURBOPROP ENGINE WITH AN APPARATUS FOR THE GENERATION OF A COOLING AIRFLOW

(75) Inventor: Matthijs Van Der Woude, Rangsdorf (DE)

(73) Assignee: Rolls-Royce Deutschland Ltd & Co KG

( * ) Notice: Subject to any disclaimer, the term of this patent is extended or adjusted under 35 U.S.C. 154(b) by 646 days.

(21) Appl. No.: 12/486,566

(22) Filed: Jun. 17, 2009

(65) Prior Publication Data

US 2009/0314004 A1    Dec. 24, 2009

(30) Foreign Application Priority Data

Jun. 20, 2008   (DE) .......................... 10 2008 028 987

(51) Int. Cl.
   *F02C 6/04*   (2006.01)
(52) U.S. Cl. ............. 60/785; 60/39.83; 60/806; 60/782; 60/226.1; 244/57; 244/58
(58) Field of Classification Search ................ 60/782, 60/785, 795, 39.83, 226.1, 806; 244/57, 244/58
See application file for complete search history.

(56) References Cited

U.S. PATENT DOCUMENTS

| | | | |
|---|---|---|---|
| 2,487,842 A | 11/1949 | Whiteman et al. | |
| 2,625,009 A | 1/1953 | Leggett et al. | |
| 4,881,367 A | 11/1989 | Flatman | |
| 5,284,012 A * | 2/1994 | Laborie et al. | 60/39.08 |
| 5,351,476 A | 10/1994 | Laborie et al. | |
| 5,743,493 A | 4/1998 | McCaughan | |
| 5,806,793 A | 9/1998 | Brossier et al. | |
| 5,987,877 A | 11/1999 | Steiner | |
| 6,000,210 A | 12/1999 | Negulescu | |
| 6,282,881 B1 * | 9/2001 | Beutin et al. | 60/39.08 |

FOREIGN PATENT DOCUMENTS

| | | |
|---|---|---|
| DE | 3810863 | 11/1988 |
| DE | 19524731 | 1/1997 |
| DE | 19524733 | 1/1997 |
| EP | 0514119 | 11/1992 |
| WO | 95/19290 | 7/1995 |

* cited by examiner

*Primary Examiner* — William H Rodriguez
*Assistant Examiner* — Craig Kim
(74) *Attorney, Agent, or Firm* — Timothy J. Klima; Shuttleworth & Ingersoll, PLC (57) ABSTRACT

A turboprop engine (1) includes an engine nacelle (3) and at least one bleed air line (25) on the low-pressure compressor (4) and at least one ejector (21) formed by a cooling air duct (24) and a nozzle (22) to create a cooling air flow within the engine nacelle during critical ground idle operation (controlled or uncontrolled), and without undesirably increasing fuel consumption or disturbing the work cycle of the engine (1). The ejector (21) is arranged within the engine nacelle (3) in the forward part of the turboprop engine (1), with the cooling air duct (24) appertaining to the ejector (21) connecting at least one air intake (23) disposed on the periphery of the engine nacelle (3) with the interior of the engine nacelle (3), and with the at least one nozzle (22) being arranged in the cooling air duct (24).

8 Claims, 6 Drawing Sheets

TURBOPROP ENGINE WITH AN APPARATUS FOR THE GENERATION OF A COOLING AIRFLOW

This application claims priority to German Patent Application DE102008028987.6 filed Jun. 20, 2008, the entirety of which is incorporated by reference herein.

This invention relates to a turboprop engine with an apparatus for the generation of a cooling airflow and a method for the generation of a cooling airflow in the nacelle of the turboprop engine.

Turboprop gas turbines (propeller turbines) have been used in aviation for many years. Generally, this type of engine has variable propeller blades to enable propulsion to be reversed on the ground, run the turbine at idle without propulsive component and set the optimum pitch at any speed, respectively.

In order to cool the engine throughout the entire speed range, the heated air volume in the engine nacelle is usually continuously exhausted in the rear part of the engine. This is accomplished by way of an exhaust ejector nozzle which utilizes the kinetic energy of the exhaust jet of the core engine. The air discharged by the exhaust ejector nozzle is replaced by fresh, cool ambient air supplied in the form of cooling air via air intakes arranged in the forward part of the engine. The cooling air is introduced through open air intakes into the volume between engine and engine nacelle and is issued therein.

On its way to the exhaust ejector nozzle, this cooling air passes along the engine components heated by the work cycle of the core engine, thereby convectively absorbing heat. This prevents limitedly heat-resistant cable harnesses and other components installed on the engine and within the engine nacelle from being overheated. The turbine casings can also be provided with a heat shield which in connection with the aforementioned exhaust ejector nozzle provides an annular gap on which an aerodynamically optimized intake (bell mouth) can be disposed in the forward cooling-duct inlet area.

In the bell mouth, the air, which initially passes along the engine with relatively low flow velocity, is accelerated in the annular gap, thereby being enabled to convectively absorb an even higher amount of heat of the turbine casing before leaving the engine, mixed with the turbine exhaust gases, via the exhaust ejector nozzle at the rear part of the engine.

While the cooling mechanism described for these turboprop engines works excellently in flight or during higher load cases, the ground idle range usually presents a more or less critical phase in the cooling of the engine. This applies essentially to load ranges with neutral propeller position (feathering pitch) in which the air surrounding the engine lacks kinetic energy to forcedly enter the engine nacelle. The cooling principle merely relies on the operation of the exhaust ejector nozzle at the engine exit which continuously discharges sufficient air from the engine nacelle.

While this ejector will only operate in the manner conceived if sufficient kinetic energy of the exhaust jet is available, with the static pressure in the exhaust ejector nozzle being lower than the static pressure or the total pressure in the engine nacelle, turboprop engines frequently encounter situations in the ground idle range and in the event of tail wind in which a reversal of the pressure conditions can occur. Within a few seconds, hot exhaust gas may then flow via the ejector gap or the annular gap, if any, directly into the engine nacelle area. The hot gases very quickly increase the ambient air temperature of the limitedly heat-resistant cable harnesses and other components arranged in the engine nacelle, this normally resulting in accelerated thermal aging and premature failure of components. Depending on the engine type, the temperatures can rapidly reach 500 to 700° C.

In most cases, reverse flow is impeded by increasing propeller pitch and engine power, which in ground operation is however undesirable as it leads to higher fuel consumption.

A further solution is known in which the high-pressure compressor bleed air is issued via several ejectors into the above mentioned annular gap to direct the main cooling flow in this annular gap towards the exhaust ejector nozzle at the rear part of the engine. This is intended to prevent hot gases from flowing back into the engine nacelle.

While this solution is intended to force a flow in the annular gap, it involves the risk that the static pressure therein may exceed that in the engine nacelle, resulting in a local reversal of flow. Moreover, a major disadvantage of this solution is the requirement for many extra parts, such as lines running to the individual ejectors in the annular gap, resulting in a substantial increase in weight. Furthermore, high-pressure compressor bleed air is needed which, as it must additionally be withdrawn from the work cycle, results in increased fuel consumption on the ground.

Moreover, Patent Specification U.S. Pat. No. 6,282,881 B1 refers to the application of high-pressure compressor bleed air, or compressor bleed air in general, discharged by an ejector nozzle into an air duct behind the gearbox oil heat exchanger to improve cooling of the gearbox oil during ground operation.

Also this solution primarily employs high-pressure compressor bleed air, with the result that engine efficiency is again reduced and fuel consumption accordingly increased. However, this solution merely relates to improved cooling of the gearbox oil, while not providing remedy to the problem of overheating the engine nacelle by reverse flow.

A broad aspect of this invention is to provide improved cooling of the engine components in the engine nacelle also during critical ground idle operation (controlled or uncontrolled) without undesirably increasing fuel consumption or disturbing the work cycle of the engine.

It is a particular object of the present invention to provide a turboprop engine with an apparatus for the generation of a cooling airflow, with the turboprop engine including an engine nacelle and at least one bleed air line on the low-pressure compressor, and with the apparatus having at least one ejector formed by a cooling air duct and a nozzle.

According to the present invention, the ejector is arranged within the engine nacelle in the forward part of the turboprop engine, with the cooling air duct appertaining to the ejector connecting at least one air intake disposed on the periphery of the engine nacelle with the interior of the engine nacelle, and with at least one nozzle being arranged in the cooling air duct.

The bleed air issuing through the nozzle of the ejector into the cooling air duct, according to the ejector principle entrains cool ambient air, thereby delivering a sufficiently cool air mixture to the engine nacelle to cool the engine, with this air, as compared to the temperatures of up to 500 to 700° C. (without cooling), being significantly colder, namely less than 200° C. The mixing temperature can be approx. 130° C., depending on the engine type and the low-pressure compression ratio thereof.

Accordingly, the ejector provides for safeguarded, improved cooling in ground idle operation of the turboprop engine, also in the feathering position of the propellers and in the event of tail wind. Summarizing then, the present invention provides for reduced fuel consumption on the ground since the improved cooling obviates the need for pitching the propeller. In contrast to the use of high-pressure compressor bleed air, the work cycle is not disturbed.

Furthermore, use is made of the cooling-air duct anyway provided in the forward part of the engine. Therefore, the apparatus incurs only minor retrofitting effort, with only few components in the nacelle of the engine and only small increase in weight.

In particular, the nozzle of the ejector is connected to the bleed air line on the low-pressure compressor.

On many gas turbines, in particular axial-flow compressor gas turbines in turboprop engines, a certain amount of the low-pressure compressor air supplied to the high-pressure compressor of the core engine must in idle operation be bled to the atmosphere via bleed air valves without being used. This is also done when the gas turbine is retarded from a higher power level to prevent the high-pressure compressor from surging upon reaching the surge limit.

According to the present invention, the available bleed air of the low-pressure compressor is used as required to increase the air pressure within the engine nacelle slightly above the static pressure in the exhaust ejector nozzle. Thus, the flow direction of the cooling air in the engine nacelle is stabilizingly forced towards the exhaust ejector nozzle, in particular during the otherwise critical idle operation on the ground. The return of bleed air from the low-pressure compressor back into the work cycle of the engine also leads to reduced fuel consumption. With turboprop engines according to the state of the art, however, bleed air is discharged from the engine nacelle without being exploited.

In an embodiment of the present invention, the bleed air line is completely connected to the nozzle of the ejector. Here, the bleed air is completely used for aspirating the ambient air. Accordingly, the flow energy of the bleed air is not left unexploited.

In an alternative embodiment of the present invention, the bleed air line divides into a first partial line and a second partial line, with the first partial line being connected to the nozzle of the ejector, and with the second partial line being routed out of the engine nacelle. Thus, bleed air is used only to the amount indispensable for aspirating the ambient air and producing an effective cooling airflow. In the process, the cooling air is heated only to a minimum extent.

In a preferred embodiment a Laval nozzle is immediately arranged upstream of the ejector nozzle.

By virtue of the compression energy, the temperature of the bleed air of the low-pressure compressor, depending on the compression pressure, has already reached approx. 200° C. on the pressure side of the bleed air valve. It can be further cooled down by the Laval nozzle, in which the temperature of the bleed air is decreased as it expands while the exit velocity of the bleed air leaving the nozzle is increased. This improves the efficiency of the ejectors.

Alternatively, the nozzles of the ejectors form at least one group, with a Laval nozzle being arranged upstream of each group. This enables the constructional effort and, consequently, the manufacturing costs to be reduced.

Preferably, the nozzle of the ejector is provided with a mixer. The mixer reduces the mixing time and, consequently, the running length of the hot bleed airjet, with the ambient air bringing the bleed air to a lower temperature level. In consequence thereof, temperature distribution is homogenized, providing for a more efficient and extensive cooling of the engine within the engine nacelle.

More particularly, the mixer is a bloom mixer. Owing to its geometry, the bloom mixer provides for particularly good mixing of the air jet issuing from the nozzle with the ambient air in the cooling air duct.

In a further embodiment of the present invention, a separate intake is provided in the engine nacelle leading via at least one blower inlet line to at least one blower from which a blower outlet line leads to the nozzle of the ejector.

Here, the blower delivers only cool ambient air (fresh air) into the engine nacelle. This air is induced via a separate intake and blown into the same cooling air duct by which stagnation air is already introduced into the engine nacelle when the ambient air is moving and when the aircraft is in flight.

In this alternative embodiment, the ejector-supported flow is not produced directly by the bleed air, but only by the airflow of the blower which is introduced through the nozzle of the ejector into the cooling air duct. The flow velocity of the blower air produces an ejector effect in the cooling air duct. The cooling air is driven into the engine nacelle and prevents a reverse flow from occurring in the exhaust ejector nozzle provided that the engine nacelle is particularly tight, i.e. the overpressure in the nacelle escapes only via the exhaust ejector and not through other gaps. Tightness of the engine nacelle is indispensable for the applicability of the arrangements and methods according to the present invention as, otherwise, the pressure in the engine nacelle cannot exceed the static pressure in the exhaust ejector nozzle.

Preferably, a flapper valve is arranged in the blower inlet line. The flapper valve prevents the air from flowing through the blower by allowing flow in one direction only. Thus, the turbine driven by bleed air is prevented from co-rotating in the windmilling mode also when no bleed air is issued.

More particularly, the bleed air line leads to at least one turbine which is coupled to the blower and from which at least one turbine outlet line is routed out of the engine nacelle. The bleed air from the low-pressure compressor is accordingly expanded overboard via a small turbine which uses the energy stored in the compressed bleed air to drive the blower. However, the blower can also be driven by other mechanisms, for example by a motor (e.g. electric motor, hydraulic motor).

Solution to the above problems is further provided by a method for the generation of a cooling airflow in the engine nacelle of the turboprop engine. By way of the apparatus, ambient air flows through the air intake into the cooling air duct and from there into the interior of the engine nacelle, forming a cooling airflow which passes within the engine nacelle along the engine components to the exhaust ejector nozzle, thereby cooling the engine components.

Accordingly, the cooling airflow fills the entire engine nacelle, thereby cooling all engine components arranged within the engine nacelle, not just individual ones.

Preferably, the cooling airflow is generated from several mixed flows in that the air jets issuing from the nozzles of the ejectors are mixed with the ambient air flowing through the air intakes into the cooling air ducts and the mixed flows, upon leaving the cooling air ducts, are mixed with each other to form the cooling airflow.

The mixed flows deliver ambient air into the engine nacelle to cool the engine. Depending on the embodiment of the apparatus, the mixed flows can, under load and in ground idle operation as well as in the feathering position of the propellers and in the event of tail wind, be produced only if the bleed air valve is open. In the case of the first two embodiments, the mixed flow is produced directly with bleed air or, as in the case of the third embodiment, indirectly by blower air.

In particular in ground idle operation, a static pressure is produced in the engine nacelle by way of the ejector which exceeds the static pressure in the exhaust ejector nozzle. The increase of the static pressure in the nacelle of the engine precludes reflow from the exhaust ejector nozzle into the engine nacelle, as already described in the above.

In an embodiment of the present invention, bleed air is passed from the bleed air line of the low-pressure compressor into the nozzle of the ejector, with the air jet issuing from the nozzle inducing ambient air through the cooling air duct of the ejector, and with the ambient air entering the cooling air duct through the air inlet. In the process, the flow energy of the, anyway available, bleed air is used to produce the ejector effect.

The bleed air from the bleed air line is completely fed into the ejector nozzle. In the process, the flow energy of the bleed air is completely used.

Alternatively, the bleed air is divided into at least a first partial flow and at least a second partial flow, with the first partial flow being fed to the nozzle of the ejector and the second partial flow being routed out of the engine nacelle. This enables the bleed airflow to be set such that it is just large enough to induce ambient air and small enough to keep the heating of the ambient air low.

The bleed air entering the nozzle of the ejector can be cooled by the Laval nozzle arranged upstream of the nozzle. This enables the temperature of the mixed flows and, thus, of the entire cooling airflow to be decreased.

The air jet leaving the nozzle of the ejector can be mixed with the ambient air in the cooling air duct by the mixer, with the temperature distribution thereof being homogenized in the process. This enables the temperature of the mixed flow and, thus, of the entire cooling airflow to be further lowered.

In a further embodiment, the blower, in ground idle operation, aspirates ambient air from the separate intake through the blower inlet line to deliver it through the blower outlet line into the nozzle. In this embodiment, the ambient air is not heated since the air jet of the ejector is generated from ambient air.

Preferably, the bleed air from the bleed air line drives the blower via the turbine and is afterwards discharged from the engine nacelle. Again, the bleed air is used to produce the cooling airflow without heating the ambient air.

Under load, the airflow outside of the engine nacelle causes ambient air to enter the cooling air duct, with the ejector effect of the apparatus, and thus the induction of ambient air through the cooling air duct, being reduced or terminated in dependence of the control state of the bleed air valve. Accordingly, the ejector effect is not required under load.

In the following, the state of the art and three examples of the present invention are more fully described in light of the accompanying six Figures.

Figure 1:
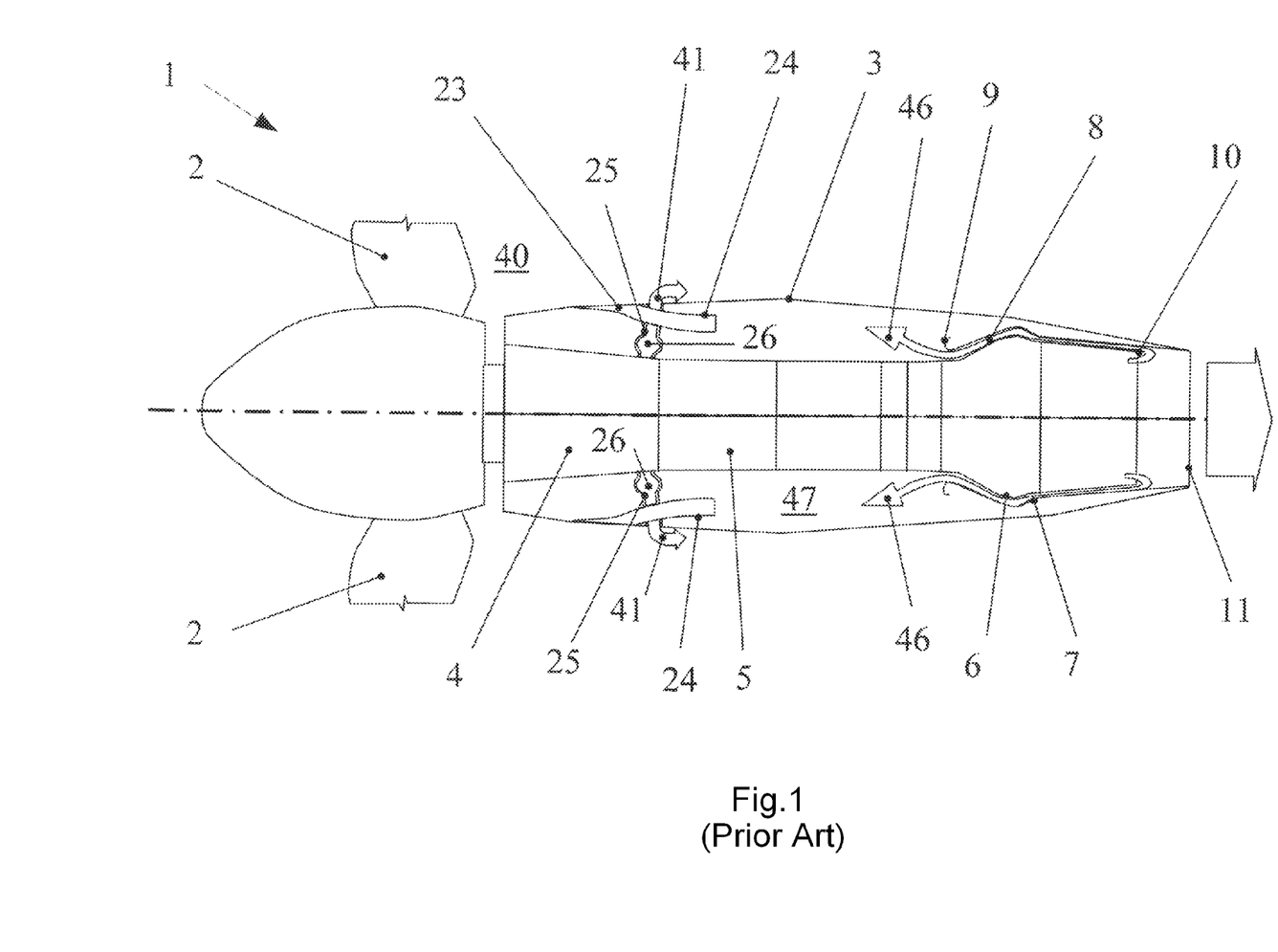
FIG. 1 (Prior Art) is a schematic representation of a turboprop engine in accordance with the state of the art.
Figure 2:
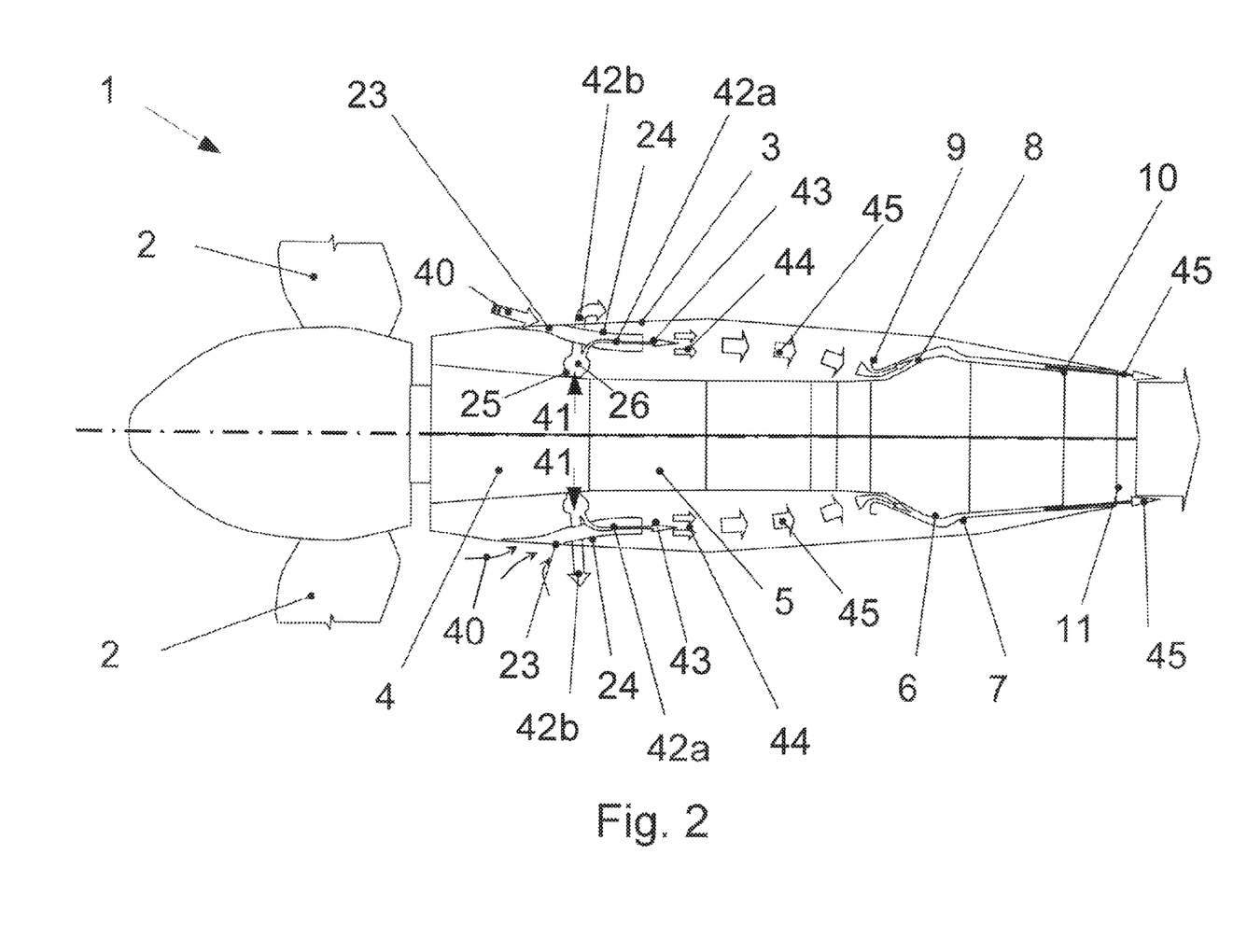
FIG. 2 is a schematic representation of a turboprop engine in accordance with the present invention with the flows produced by a first embodiment of the apparatus.
Figure 5:
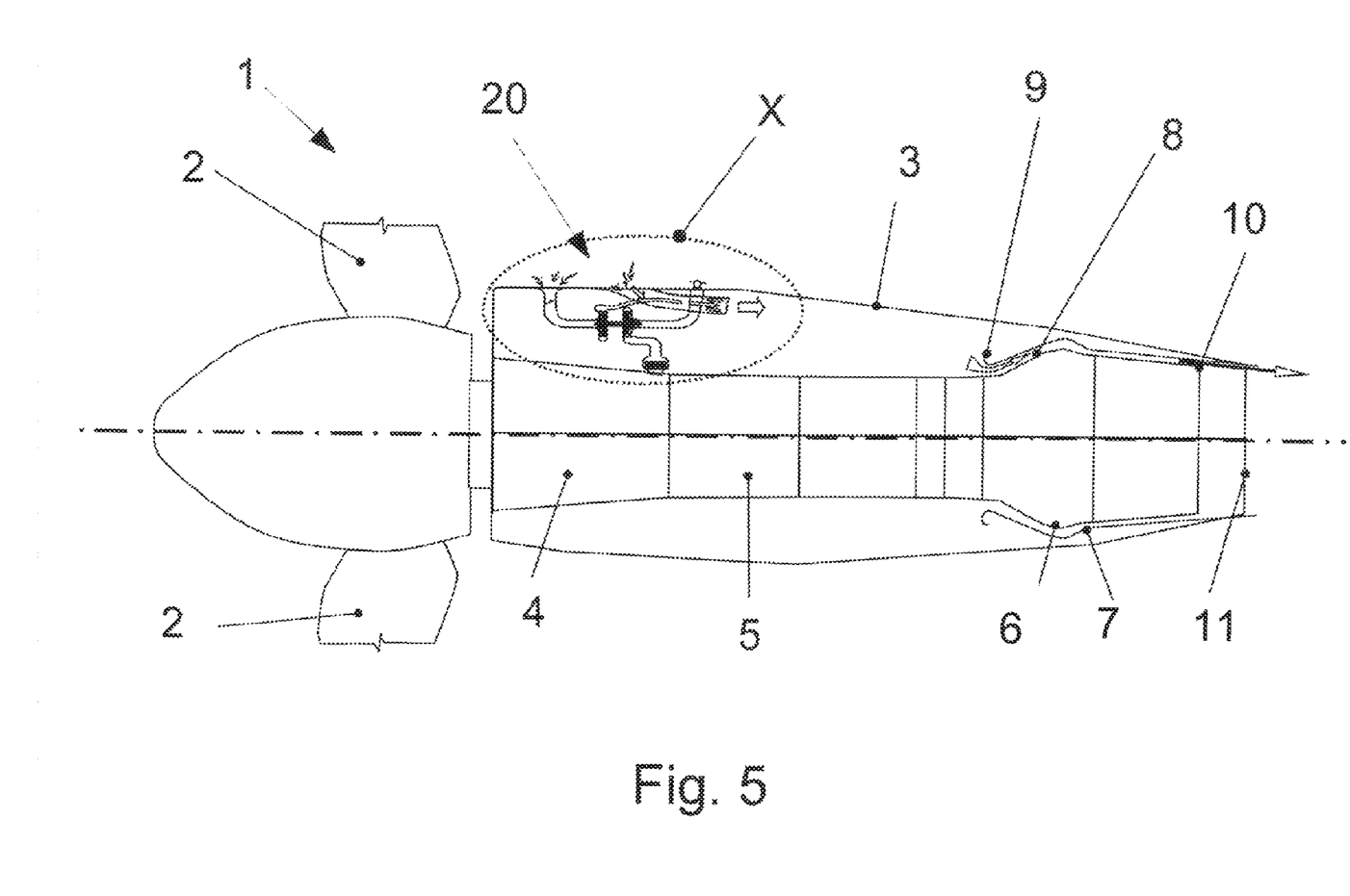
FIG. 5 is a schematic representation of a turboprop engine with a third embodiment of the apparatus.

FIGS. 1, 2 and 5 each show a turboprop engine 1 with propeller blades 2, an engine nacelle 3, a low-pressure compressor 4, a high-pressure compressor 5, a turbine casing 6, a heat shield 7, an exhaust ejector nozzle 10 and an exhaust nozzle 11.

The propeller blades 2 are arranged upstream of the engine nacelle 3. Within the engine nacelle 3 the low-pressure compressor 4 and the high-pressure 5 are arranged one behind the other.

The turbine casing 6 is disposed in the downstream portion of the engine nacelle 3 and is enclosed by the heat shield 7. Disposed between the turbine casing 6 and the heat shield 7 is an annular gap 8. A bell mouth 9 adjoins the heat shield 7 in the upstream direction. The exhaust ejector nozzle 10 is disposed at the downstream end of the turbine casing 6. At the downstream end of the engine nacelle 3, the engine nacelle 3 and the heat shield 7 form the exhaust nozzle 11.

According to FIGS. 1 and 2, an air intake 23 is arranged on the periphery of the engine nacelle 3. Also, several air intakes 23 may be provided, if applicable in even arrangement, on the periphery of the engine nacelle 3. The air intake 23 issues into a tubular cooling air duct 24 which essentially axially protrudes into the engine nacelle 3 in the direction of the exhaust ejector nozzle 10 and the exhaust nozzle 11.

A bleed air line 25 with a bleed air valve 26 branches off the downstream end of the low-pressure compressor 4.

FIG. 1 (Prior Art) shows a turboprop engine 1 according to the state of the art. On these turboprop engines, bleed air 41 is in certain operating ranges, in particular during ground idle operation, discharged from the engine nacelle 3 through the bleed air line 25 and the bleed air valve 26 to prevent the high-pressure compressor 5 from surging upon reaching the surge limit.

Under load or in ground idle operation with larger propeller pitch, ambient air 40 flows through the air intake 23 into the engine nacelle 3 to cool the—not illustrated—engine components. The total pressure $p_{tNa}$ (Na=nacelle) in the engine nacelle 3 is here lower than the total pressure $p_{tamb}$ (amb=ambient air) of the ambient air 40 and higher than the static pressure $p_{sNo}$ (No=nozzle) at the exhaust ejector nozzle 10. Accordingly, the exhaust ejector nozzle 10 is operative.

In ground idle operation with negative or slightly positive propeller pitch, under tail wind conditions or with the propeller in feathering position, no ambient air 40 will enter the tubular cooling air duct 24 through the air intake 23, with the effect that no cooling airflow is produced and the air volume 47 in the engine nacelle 3 remains stationary. The total pressure $p_{tNa}$ in the engine nacelle 3 is here lower than the static pressure $p_{sNo}$ at the exhaust ejector nozzle 10. In turn, the static pressure $p_{sNo}$ at the exhaust ejector nozzle 10 is higher than the total pressure $p_{tamb}$ of ambient air 40. Thus, a reflow 46 is produced which carries the exhaust gas from the exhaust ejector nozzle 10 into the engine nacelle 3. Accordingly, the exhaust ejector nozzle 10 is inoperative under these operating conditions.

FIG. 2 schematically shows the flows produced in the engine nacelle 3 of the turboprop engine 1 according to the present invention. While the upper half of FIG. 2 shows the flows under load (flight operation), the lower half shows the flows in ground idle operation or in the event of tail wind, respectively. The flows are generated by way of the apparatus 20 shown in FIG. 3.

Bleed air 41 is tapped from the low-pressure compressor 4. The bleed air 41 flows through the bleed air line 25 and the bleed air valve 26 and is divided downstream of the bleed air valve 26 into a first partial flow 42a and a second partial flow 42b. The first partial flow 42a is fed into the cooling air duct 24 and forms an air jet 43. The second partial flow 42b is routed out of the engine nacelle 3.

Under load or in idle operation during flight as well as during throttling of the engine power (upper half of FIG. 2), ambient air 40 in the form of stagnation air automatically flows through the air intake 23 provided on the periphery of the engine nacelle 3 into the cooling air duct 24 arranged in the interior of the engine nacelle 3. The ambient air 41 is mixed in the cooling air duct 24 with the air jet 43 formed from the first partial flow 42a of the bleed air 41 to produce a mixed flow 44.

In ground idle operation and in the event of tail wind (bottom half of FIG. 2), the air jet 43 formed from the bleed air 41 produces a suction effect in the cooling air duct 24 upon entering the cooling air duct 24 by which the ambient air 40 is induced through the air intake 23 into the cooling air duct 24. Accordingly, also under these operating conditions, the air jet 43 is mixed with the ambient air 40 to form a mixed flow 44.

Also, several ejectors 21 producing several mixed flows 44 can be provided on the circumference of the engine nacelle 3, if applicable in even distribution. In this case, the mixed flows 44 distributed circumferentially in the engine nacelle 3 unite downstream under all operating conditions to form one cooling airflow 45. The cooling airflow 45 passes along—not illustrated—engine components, thereby cooling the latter. Subsequently, the cooling airflow 45 flows through the bell mouth 9 into the annular gap 8 between the turbine casing 6 and the heat shield 7 to cool these areas likewise. Then, the cooling airflow 45 is passed along the exhaust ejector nozzle 10 and from there through the exhaust nozzle 11 to the environment. In ground operation and in the event of tail wind (bottom half of FIG. 2) the inoperativeness of the exhaust ejector nozzle 10 is compensated by the cooling airflow 45 since the apparatus provides for a positive pressure drop in the turboprop engine 1 ($p_{tNa} > p_{sNo} > p_{tamb}$).

Figure 3:
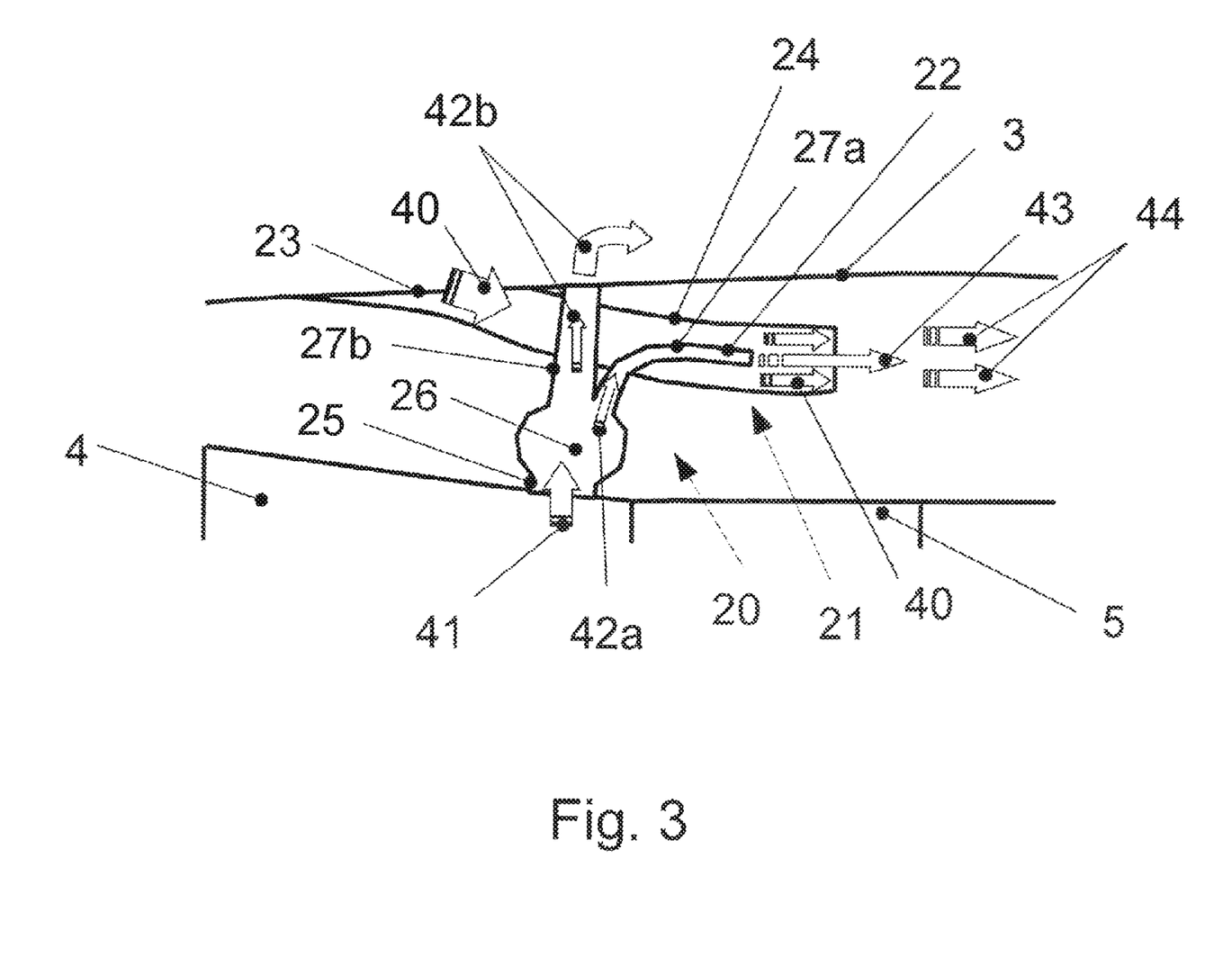
FIG. 3 is a detail view of the first embodiment of the apparatus of the turboprop engine in accordance with the present invention.
Figure 4:
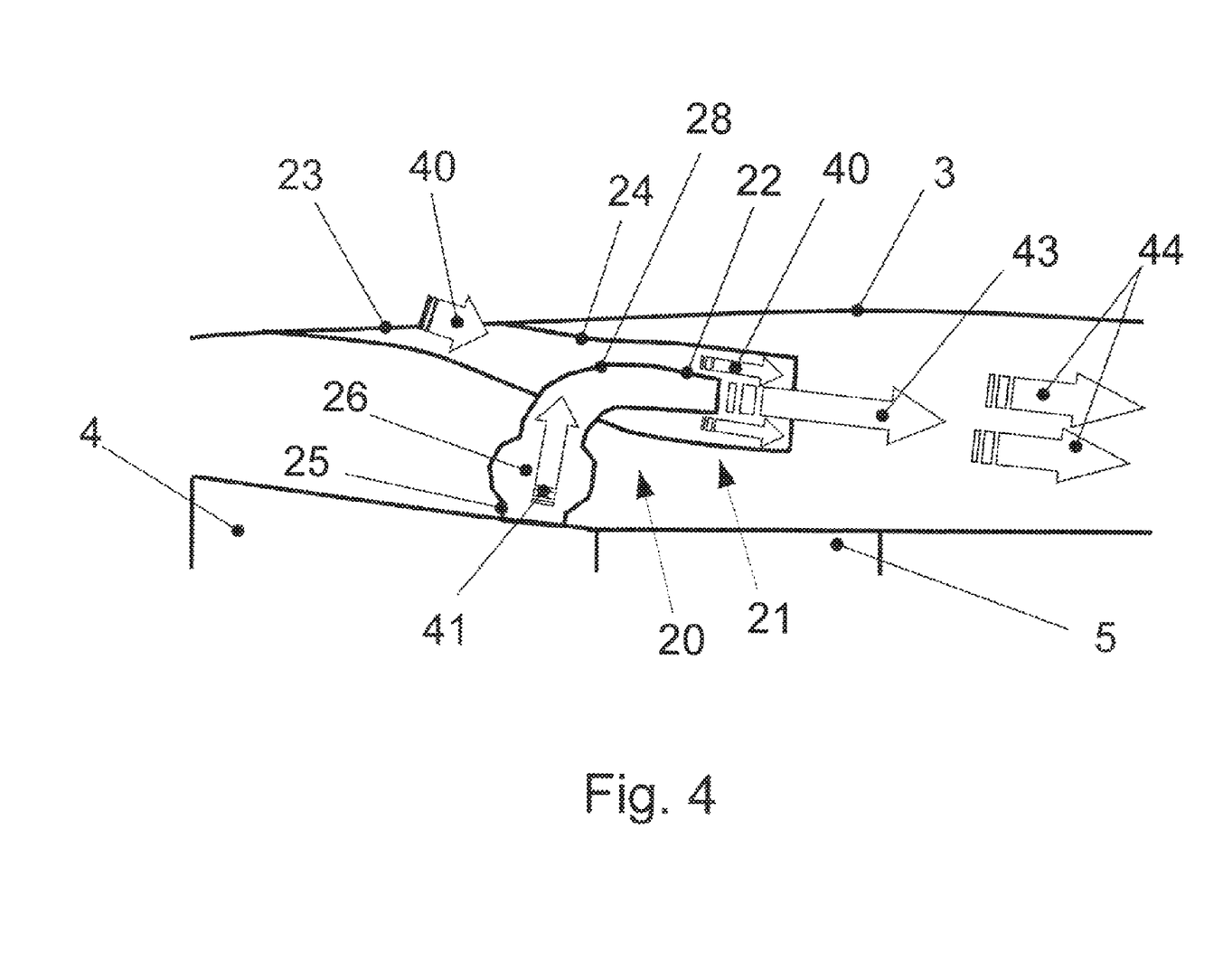
FIG. 4 is a detail view of the second embodiment of the apparatus of the turboprop engine in accordance with the present invention.
Figure 6:
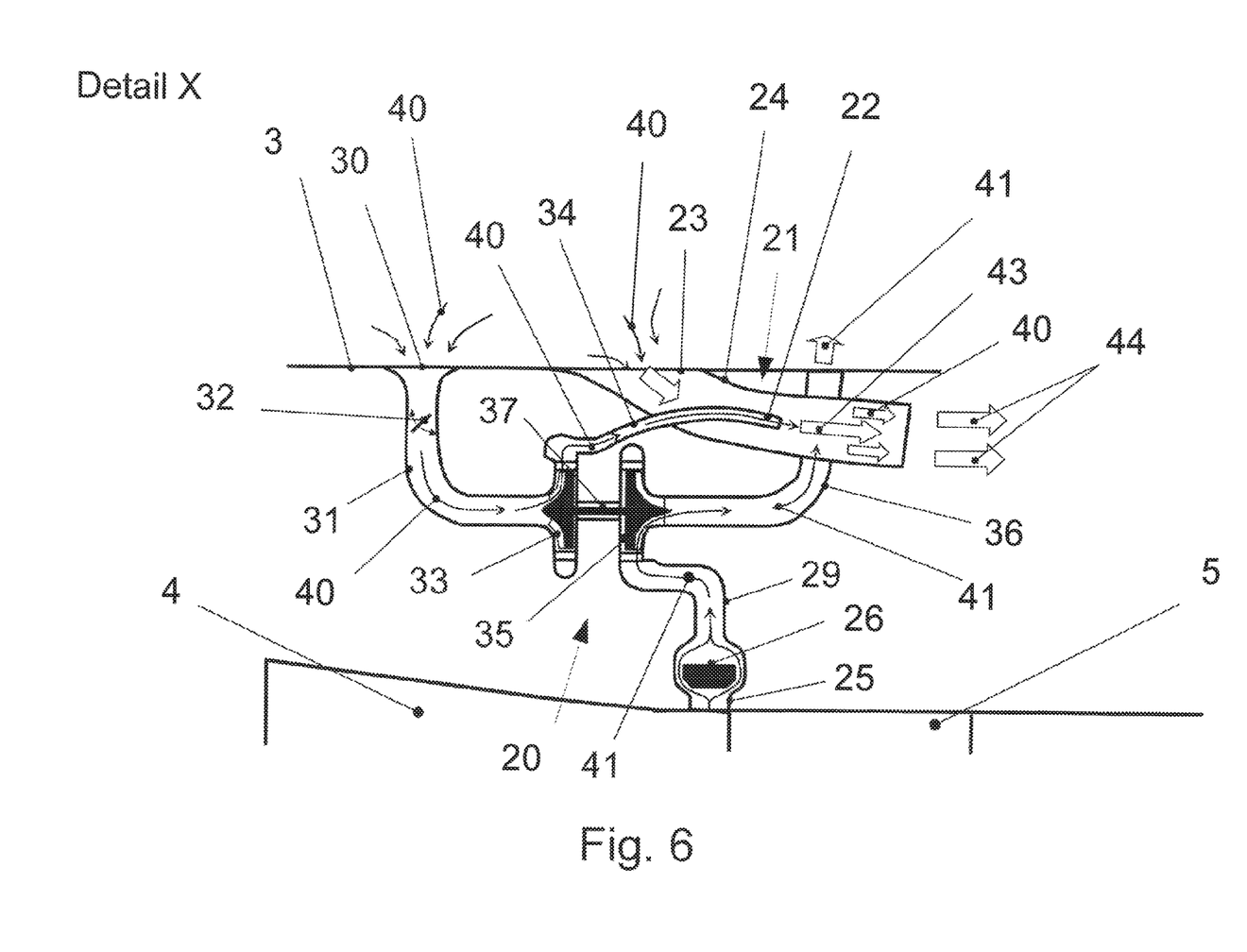
FIG. 6 is a detail view of the third embodiment of the present invention.

In order to produce the cooling airflow 45 in ground idle operation or in the event of tail wind, respectively, an apparatus 20 which has one ejector 21 or, if applicable, several ejectors 21 as detailed in FIGS. 3, 4 and 6 is used in the engine nacelle 3.

FIG. 3 is a detail view of the first embodiment of the apparatus 20 of the turboprop engine 1 according to the present invention (cf. FIG. 2) with partial usage of the bleed air 41. The engine nacelle 3, the low-pressure compressor 4 and the high-pressure compressor 5 of the turboprop engine 1 are indicated for illustration. The apparatus 20 includes a first partial line 27a and a second partial line 27b of the bleed air line 25 and an ejector 21.

The bleed air line 25 includes a bleed air valve 26 and is divided downstream of the bleed air valve 26 into a first partial line 27a and a second partial line 27b.

The first partial line 27a is, at its end, provided with a nozzle 22 and extends into the cooling air duct 24, with the nozzle 22, depending on the cross-sectional shape, being concentrically or centrally arranged in the cooling air duct 24. The second partial line 27b essentially radially extends past the cooling air duct 24 and out of the engine nacelle 3.

The ejector 21 is formed by the nozzle 22 of the first partial line 27a and the cooling air duct 24. If several ejectors 21 are used, the ejectors 21—due to the even distribution, if applicable, of the several cooling air ducts 24, which are correspondingly provided, and the first partial lines 27a arranged in the circumferential direction within the engine nacelle 3—are likewise, if applicable, circumferentially evenly distributed within the engine nacelle 3.

When the bleed air valve 26 is open, the bleed air 41 flows through the bleed air line 25 and the bleed air valve 26. Downstream of the bleed air valve 26, the flow divides into a first partial flow 42a and a second partial flow 42b, with the first partial flow 42a being fed through the first partial line 27a and the second partial flow 42b being fed through the second partial line 27b. The nozzle 22 arranged at the ends of the first partial line 27a produces an air jet 43 from the first partial flow 42a. The second partial flow 42b passes through the second partial line 27b out of the engine nacelle 3 to the environment.

The air jet 43 produced from the first partial flow 42a creates an ejector effect in the cooling air duct 24 surrounding the nozzle 22 by virtue of which ambient air 40 is induced through the air intake 23 into the cooling air duct 24. Accordingly, only the first partial flow 42a of the bleed air 41 is used for aspiration. If several ejectors 21 are used, the aspirated ambient air 40, upon leaving the several cooling air ducts 24, which are correspondingly provided, mixes with the air jets 43 from the nozzles 22 of the first partial lines 27a of the ejectors 21 to form the mixed airflows 44 uniting downstream into the cooling airflow 45 (cf. FIG. 2).

The bleed air valve 26 is closed under certain operating conditions, in load and flight operation. In the closed state of the bleed air valve 26 the ejector effect is non-existent. In this case, the ambient air 40, as already described with reference to the upper half of FIG. 2, automatically flows (without suction) through the air intake 23 into the cooling air duct 24 and mixes with the air jet 43.

FIG. 4 is a detail view of the second embodiment of the apparatus 20 of the turboprop engine 1 in accordance with the present invention with complete utilization of the bleed air 41. As in FIG. 3, the engine nacelle 3, the low-pressure compressor 4 and the high-pressure compressor 5 are indicated for clarity. The apparatus 20 includes an ejector nozzle inlet line 28 of the bleed air line 25 and the appertaining ejector 21.

The bleed air line 25 includes the bleed air valve 26 and issues downstream of the bleed air valve 26 into an ejector nozzle inlet line 28. If several ejectors 21 with several ejector nozzle inlet lines 28 are provided, they are circumferentially, if applicable evenly, distributed in the engine nacelle 3. The ejector nozzle inlet line 28 is, at its end, provided with a nozzle 22 and extends into the cooling air duct 24, with the nozzle 22, depending on its cross-sectional shape, being concentrically or centrally arranged in the cooling air duct 24.

The ejector 21 is formed by the nozzle 22 and the cooling air duct 24. If several ejectors are used, the ejectors 21—due to the even distribution, if applicable, of the appertaining cooling air ducts 24 and the several ejector nozzle inlet lines 28 of the bleed air line 25, which are correspondingly provided in the circumferential direction within the engine nacelle 3—are likewise circumferentially evenly distributed within the engine nacelle 3.

In ground idle operation and in the event of tail wind, the bleed air 41, with the bleed air valve 26 being open, flows through the bleed air line 25 and the bleed air valve 26 into the ejector nozzle inlet line 28 of the bleed air line 25. The nozzle 22 provided at the end of the ejector nozzle inlet line 28 of the bleed air line 25 produces an air jet 43 from the bleed air 41.

The air jet 43 produced in the nozzle 22 creates an ejector effect in the cooling air duct 24 surrounding the nozzle 22 by virtue of which ambient air 40 is induced through the air intake 23 into the cooling air duct 24. Accordingly, the bleed air 41 is used completely for aspiration. The aspirated ambient air 40, upon leaving the cooling air duct 24, mixes with the air jet 43 from the nozzle 22 of the ejector nozzle inlet line 28 of the bleed air line 25 to form the mixed airflow 44. If several ejectors 21 are used, the several mixing airflows 44, which are correspondingly existing, unite downstream to form the cooling airflow 45 (ref. FIG. 2).

The bleed air valve 26 is closed under certain operating conditions. In the closed state of the bleed air valve 26 under load (flight operation), the ejector effect is non-existent. In this case, the ambient air 40 automatically flows (without suction) through the air intake 23 into cooling air duct 24 and mixes with the air jet 23, as already described with reference to FIG. 2.

FIG. 5 schematically shows a turboprop engine 1 as already described above with the third embodiment of the apparatus 20. Section X is shown in FIG. 6 in detail view.

In FIG. 6, the engine nacelle 3, the low-pressure compressor 4 and the high-pressure 5 are again indicated for clarity. The apparatus 20 essentially includes an ejector 21, a turbine 35 and a blower 33. If several ejectors 21 are used, the number of ejectors 21 corresponds to the number of bleed air valves 26.

The bleed air line 25 includes the bleed air valve 26. Downstream of the bleed air valve 26, the bleed air line 25 forms an ejector nozzle inlet line 28 leading to a turbine 35. If several ejectors 21 are used, the appertaining turbines are circumferentially, if applicable evenly, distributed in dependence of the number of bleed air valves 26 and the space available within the engine nacelle 3. Connected to the outlet of the turbine 35 is a turbine outlet line 36. The turbine outlet line 36 leads through the engine nacelle 3 to the environment.

The blower 33 is coupled to a turbine 35 via a shaft 37 each. The inlet of the blower 33 is connected via a blower inlet line 31 to a separate intake 30 in the engine nacelle 3. A flapper valve 32 is provided in the blower inlet line 31. A blower outlet line 34 is connected to the outlet of the blower 33. A nozzle 22 is provided at the end of the blower outlet line 34. The blower outlet line 34 extends into a cooling air duct 24, with the nozzle 22 of the blower outlet line 34, depending on the cross-sectional shape, being arranged concentrically or centrally in the cooling air duct 24. If several ejectors are used, blowers 33 are circumferentially arranged in the engine nacelle 3 in dependence of the number of turbines 35.

The ejector 21 is formed by the nozzle 22 and the cooling air duct 24.

When the bleed air valve 26 is open, bleed air 41 flows through the bleed air line 25 and the bleed air valve 26 into the turbine inlet line 29 to the turbine 35 to drive the latter. Subsequently, the bleed air 41 is discharged through the turbine outlet line 36 out of the engine nacelle 3 to the environment.

The turbine 35 drives the blower 33 via the shaft 37. This blower 33 induces ambient air 40 through the separate intake 30 and via the blower inlet line 31. The aspirated ambient air 40 is delivered by the blower 33 into the blower outlet line 34 and into the nozzle 22.

The air jet 43 produced in the nozzle 22 creates an ejector effect in the cooling air duct 24 surrounding the nozzle 22 by virtue of which ambient air 40 is induced through the air intake 23 into the cooling air duct 24. The aspirated ambient air 40, upon leaving the cooling air duct 24, mixes with the airjet 43 from the nozzle 22 of the blower outlet line 34 to form the mixed airflow 44. If several ejectors 21 are used, the mixed airflows 44 issuing from the individual ejectors 21 unite downstream to form the cooling airflow 45 (ref. FIG. 2).

Under load (flight operation) with the bleed air valve 26 closed, the ejector effect is non-existent. In this case, the ambient air 40 automatically flows (without suction) through the air intake 23 into the cooling air duct 24. The flapper valve 32 in the blower inlet line 31 returns to the closed position to avoid that, as a result of the static pressure decrease at the air intake 23, cooling air is drawn off via the nozzle 22 in the cooling air duct 24. The pressure decrease is produced by the increased flight speed and the resultant flow velocity around the engine past the air intakes.

Now, the ratio of static pressure $p_{sNo}$ (No=nozzle) to total pressure in the engine nacelle 3, $p_{tNa}$ (Na=nacelle) is again reversed. The static pressure $p_{sNo}$ is now again lower than the total pressure in the engine nacelle 3, $p_{tNa}$ and the exhaust ejector nozzle 10 is again operative. Theoretically, the bleed air-supported ejector 21 is no longer required, but supports the additional cooling air supply until the work cycle causes the bleed air valves to completely close as of a certain engine speed and an ejector effect is no longer produced in the cooling air duct. Then, engine cooling is again effected by stagnation air supply or aspiration until the bleed air valves re-open and the cooling air supply is supported by the bleed air.

LIST OF REFERENCE NUMERALS

1 Turboprop engine
2 Propeller blade
3 Engine nacelle
4 Low-pressure compressor
5 High-pressure compressor
6 Turbine casing
7 Heat shield
8 Annular gap
9 Bell mouth
10 Exhaust ejector nozzle
11 Exhaust nozzle
20 Apparatus
21 Ejector
22 Nozzle
23 Air intake
24 Cooling air duct
25 Bleed air line
26 Bleed air valve
27a First partial line
27b Second partial line
28 Ejector nozzle inlet line
29 Turbine inlet line
30 Separate intake
31 Blower inlet line
32 Flapper valve
33 Blower
34 Blower outlet line
35 Turbine
36 Turbine outlet line
37 Shaft
40 Ambient air
41 Bleed air
42a First partial flow
42b Second partial flow
43 Airjet
44 Mixed flow
45 Cooling airflow
46 Reflow
47 Air volume

What is claimed is:

1. A turboprop engine with an apparatus for the generation of a cooling airflow, comprising:
   an engine nacelle;
   at least one bleed air line from a low-pressure compressor;
   at least one cooling air duct connecting at least one air intake disposed on the periphery of the engine nacelle with an interior of the engine nacelle;
   at least one nozzle being positioned in the cooling air duct to form, with the cooling air duct, an ejector that creates a cooling air flow through the cooling air duct, the ejector positioned within the engine nacelle in a forward part of the turboprop engine;

wherein the nozzle of the ejector is connected to the bleed air line on the low-pressure compressor;

wherein the bleed air line is connected to the nozzle of the ejector to supply an entire bleed air flow through the bleed air line to the nozzle.

2. The turboprop engine of claim 1, wherein the ejector includes a mixer.

3. The turboprop engine of claim 2, wherein the mixer is a bloom mixer.

4. A method for generating a cooling airflow within an interior of a nacelle of a turboprop engine, comprising:

providing the engine with at least one bleed air line from a low-pressure compressor;

providing an ejector within the nacelle in a forward part of the turboprop engine that suctions ambient air from outside the nacelle through an air intake and into a cooling air duct and ejects the ambient air from the cooling air duct into the interior of the engine nacelle, forming a cooling airflow which passes within the engine nacelle along engine components to an exhaust ejector nozzle, thereby cooling the engine components;

and further comprising passing all of the bleed air from the bleed air line of the low-pressure compressor of the engine into a nozzle of the ejector and issuing an air jet from the nozzle to induce ambient air through the cooling air duct of the ejector, and with the ambient air entering the cooling air duct through the air inlet.

5. The method of claim 4, and further comprising generating the cooling airflow from several mixed flows from several ejectors, with air jets issuing from nozzles of the ejectors being mixed with the ambient air flowing through the air intakes into the cooling air ducts, and mixing the several mixed flows with each other, upon leaving the cooling air ducts, to form the cooling airflow.

6. The method of claim 4, and further comprising producing a static pressure in the engine nacelle with the ejector at ground idle operation which exceeds the static pressure in the exhaust ejector nozzle.

7. The method of claim 4, and further comprising cooling the bleed air entering the nozzle of the ejector with a Laval nozzle positioned before the nozzle.

8. The method of claim 4, and further comprising mixing the air jet leaving the nozzle of the ejector with a mixer, and thereby homogenizing a temperature distribution of the air jet.

* * * * *